(12) United States Patent
Lewis et al.

(10) Patent No.: US 9,252,945 B2
(45) Date of Patent: Feb. 2, 2016

(54) METHOD FOR RECOGNIZING A MANIPULATION OF A SENSOR AND/OR SENSOR DATA OF THE SENSOR

(71) Applicants: Matthew Lewis, Reutlingen (DE); Markus Ihle, Hemmingen (DE); Robert Szerwinski, Esslingen (DE); Jamshid Shokrollahi, Ludwigsburg (DE); Benjamin Glas, Stuttgart (DE)

(72) Inventors: Matthew Lewis, Reutlingen (DE); Markus Ihle, Hemmingen (DE); Robert Szerwinski, Esslingen (DE); Jamshid Shokrollahi, Ludwigsburg (DE); Benjamin Glas, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 117 days.

(21) Appl. No.: 14/245,429

(22) Filed: Apr. 4, 2014

(65) Prior Publication Data
US 2014/0301550 A1    Oct. 9, 2014

(30) Foreign Application Priority Data
Apr. 9, 2013   (DE) .......................... 10 2013 206 185

(51) Int. Cl.
*H04L 9/00* (2006.01)
*H04L 9/32* (2006.01)
*H04L 9/08* (2006.01)
*G06F 1/26* (2006.01)
*G08B 21/00* (2006.01)
*H04L 9/06* (2006.01)

(52) U.S. Cl.
CPC ............ *H04L 9/0825* (2013.01); *H04L 9/0822* (2013.01); *H04L 9/3226* (2013.01); *H04L 9/0637* (2013.01); *H04L 2209/24* (2013.01); *H04L 2209/84* (2013.01)

(58) Field of Classification Search
CPC ..................... G11B 20/00086; G11B 20/0021; G11B 20/00144; H04L 9/08
USPC .......................... 380/28–30, 44–47, 255–286; 713/150–154, 160–167, 189–193
See application file for complete search history.

(56) References Cited

U.S. PATENT DOCUMENTS

2012/0197911 A1* 8/2012 Banka ............... G06F 17/30864
                                                                707/752
2014/0077964 A1* 3/2014 Beligere ................. E21B 47/00
                                                                340/853.3

FOREIGN PATENT DOCUMENTS

DE    10 2009 002396    10/2010

* cited by examiner

*Primary Examiner* — Evans Desrosiers
(74) *Attorney, Agent, or Firm* — Kenyon & Kenyon LLP

(57) ABSTRACT

A method for data transmission between a sensor and an electronic control and/or regulating unit (ECU), the transmitted sensor data ($x_1, \ldots, x_t$) and the sensor being secured against a manipulation. The system provides a particularly simple, but very secure method for manipulation protection, the sensor data ($x_1, \ldots, x_t$) being transmitted via a first logical data transmission channel at a first data transmission rate, and security data (MAC; CMAC) for securing the transmitted sensor data and/or the sensor being transmitted via a second logical data transmission channel at a second data transmission rate from the sensor to the ECU. At least once at the beginning of a data transmission session, a session key is transmitted from the ECU to the sensor via a third logical data transmission channel and received by the latter, the session key being used at least for the ongoing session to generate the security data.

21 Claims, 3 Drawing Sheets

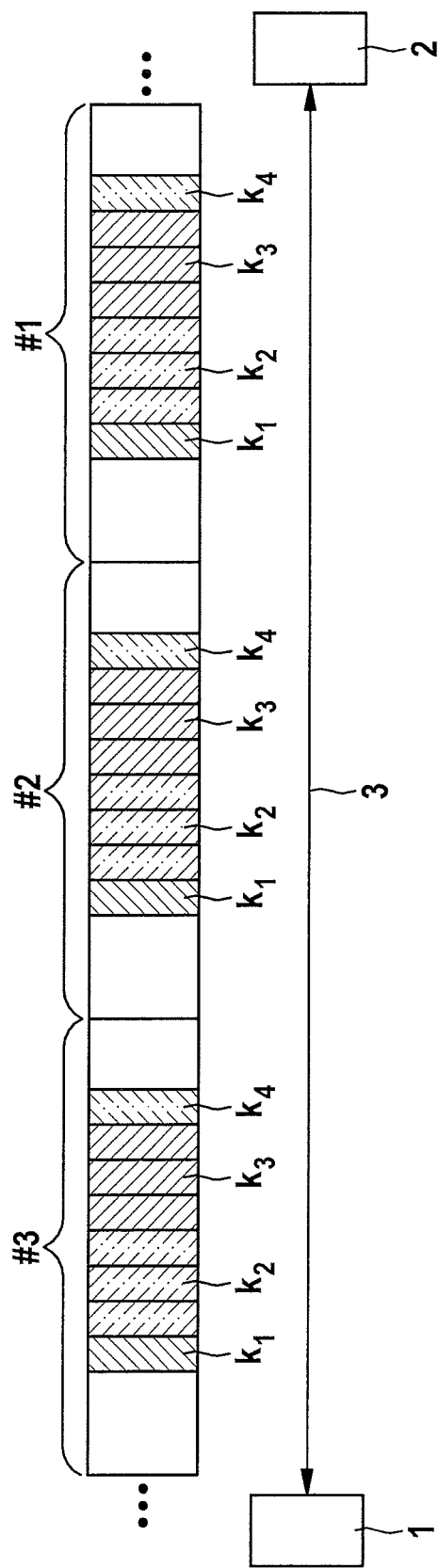

METHOD FOR RECOGNIZING A MANIPULATION OF A SENSOR AND/OR SENSOR DATA OF THE SENSOR

RELATED APPLICATION INFORMATION

The present application claims priority to and the benefit of German patent application no. 10 2013 206 185.4, which was filed in Germany on Apr. 9, 2013, the disclosure of which is incorporated herein by reference.

FIELD OF THE INVENTION

The present invention relates to a method for data transmission between a sensor and an electronic control and/or regulating unit, a manipulation of the transmitted sensor data and/or the sensor being recognized. The present invention additionally relates to a sensor, which is provided for connection to an electronic control and/or regulating unit and is configured to transmit sensor data to the control and/or regulating unit, an arrangement being provided for recognizing a manipulation of the transmitted sensor data and/or the sensor. Furthermore, the present invention relates to a control and/or regulating unit, which is provided for connection to a sensor and is configured to receive sensor data from the sensor, an arrangement being provided for recognizing a manipulation of the transmitted sensor data and the sensor. Finally, the present invention also relates to a network, including a control and/or regulating unit and at least one sensor connected thereto via a data transmission connection, an arrangement being provided for recognizing a manipulation of the sensor data transmitted from the sensor to the control and/or regulating unit and of the sensor.

BACKGROUND INFORMATION

For example, pressure sensors for detecting the pressure prevailing in a shared fuel accumulator (so-called common rail) of a fuel injection system of a motor vehicle are known from the related art. The fuel stored under the measured pressure in the accumulator is provided for injection into combustion chambers of an internal combustion engine of the motor vehicle. Such pressure sensors are connected to an electronic control and/or regulating unit (so-called engine control unit, ECU). The pressure sensors communicate via analog communication channels with the ECU. These analog channels may be manipulated relatively easily, whereby it is possible for unauthorized persons to achieve a performance enhancement of the internal combustion engine (so-called tuning). This performance enhancement is advantageous for the driver of a motor vehicle provided with the performance-enhanced internal combustion engine and generally desired thereby.

However, such tuning is not recognizable and not comprehensible for the vehicle manufacturer. This has the disadvantage that the vehicle manufacturer in the past was made liable for any problems which resulted from the impermissible performance enhancement and had to repair defects of the internal combustion engine, although these were sometimes to be attributed to the impermissible performance enhancement. For some time, many of the analog communication channels between sensors and the ECU have been replaced by digital data buses. A variety of possibilities is known from the related art for recognizing a manipulation of the sensor data digitally transmitted from the sensor to the ECU and/or of the sensor itself or to secure the sensor data and/or the sensor against a manipulation.

A corresponding method for recognizing a manipulation of transmitted sensor data and/or a sensor itself is discussed, for example, in DE 10 2009 002 396 A1. Many of the methods may have the disadvantage that they are relatively costly and complex. They place relatively high demands on the software and the hardware which are necessary to implement the manipulation recognition according to the known methods. Thus, for example, it is necessary in the case of the method known from the cited publication that two keys for generating and verifying authentication codes (so-called message authentication codes, MACs) for the data transmitted between the sensor and the ECU must be stored both in the sensor and in the ECU. This requires additional storage space both in the sensor and in the ECU, storage space being scarce and costly in the sensor in particular. In addition, the computer program for implementing the manipulation protection is relatively complex, and computing-intensive and storage-intensive as a result of the complexity of the method. In addition, substantial computing power is necessary to be able to process the complex computer program within acceptable processing times in the sensor or in the ECU.

SUMMARY OF THE INVENTION

The present invention is intended to provide a method for recognizing a manipulation of transmitted sensor data and/or a sensor itself, which meets similarly high security demands as the complex methods known from the related art, on the one hand, and is substantially simpler and faster and in particular involves significantly lesser software and hardware demands than the known methods, on the other hand.

An object which is to be achieved by the present invention is thus to provide a mechanism, which permits the ECU and later the vehicle manufacturer to detect and comprehend engine tuning. More precisely, any type of manipulation of the sensor data transmitted from the sensor to the ECU is to be detected. In addition, the provided manipulation recognition is to be provided at the lowest possible costs with respect to the chip surface area required for the implementation, the processing power of the processor, and the storage requirement, in particular with respect to a secure, nonvolatile memory.

To achieve this object, it is provided, proceeding from the method of the type described at the outset, that the sensor data are transmitted via a first logical data transmission channel at a first data transmission rate from the sensor to the control and/or regulating unit (ECU), and security data for securing the transmitted sensor data and/or the sensor are transmitted via a second logical data transmission channel at a second data transmission rate from the sensor to the control and/or regulating unit, and at least once at the beginning of a session, a session key (which may be in encrypted form) is transmitted from the control and/or regulating unit (ECU) to the sensor via a third logical transmission channel and received by the sensor and possibly decrypted. The session key is used by the sensor at least for the ongoing session to generate the security data.

The present invention is distinguished in that, for the recognition of a manipulation of the sensor and the data transmitted thereby, only one key is necessary and must be stored in the sensor and the control and/or regulating unit. With the aid of this one key, both an integrity check of the data transmitted by the sensor and received by the control and/or regulating unit and an implicit authentication of the sensor may be carried out. If the sensor receives a manipulated session key or is not capable of correctly decrypting the received session key, different keys are present at the sensor and the ECU, which may be recognized by the ECU and classified as a manipulation. Also if the sensor receives a correct key, but the transmitted sensor data were manipulated in another way during the transmission from the sensor to the ECU, the ECU may also detect this and classify it as a manipulation.

According to one advantageous refinement of the present invention, it is provided that a message authentication code (MAC) is generated via at least a part of the sensor data to be transmitted by the sensor according to a cryptographic algorithm (for example, a block cipher in the corresponding mode) while using the session key and is at least partially transmitted via the second data transmission channel as security data to the control and/or regulating unit and received by the latter. This cryptographic algorithm for generating the MAC may be also a symmetrical cryptosystem. It particularly may be provided that the algorithm used is a Rijndael algorithm according to the advanced encryption standard (AES).

However, any arbitrary alternative symmetrical cryptosystems, several of which are listed hereafter as examples, may also be used to generate the MAC within the meaning of the present invention. The MAC does not have to be generated via all sensor data to be transmitted. It is entirely possible that the MAC is only generated via a part of the sensor data to be transmitted. This may be a defined, predetermined part of the sensor data or a dynamically selected part of the sensor data. The cryptographic algorithm which is used to generate the MAC via at least a part of the sensor data to be transmitted while employing the session key may be the same algorithm which is also used by the sensor to decrypt the received encrypted security data and to ascertain the session key.

The MAC has a length of 128 bits, for example. To save bandwidth during the transmission of the MAC via the logical data transmission channel, it is conceivable that the entire MAC is not transmitted, but rather only a part thereof, for example, only n bits of the highest significance (so-called most significant bits, MSBs) of the MAC, are transmitted via the data transmission channel to the control and/or regulating unit (ECU). It is thus conceivable, for example, if the entire MAC contains 128 bits, to only transmit the 64 MSBs. Of course, the MAC may also have any other greater or smaller length. The number of the transmitted bits may also be greater or less than the specified 64 bits. Of course, the first n MSBs of the MAC also do not necessarily have to be transmitted. It is also conceivable to select arbitrary bits from the MAC in a targeted manner for the data transmission via the second data transmission channel. The transmission of only a part of the MAC is of interest in particular when a slow channel is used to transmit the security data.

According to one specific embodiment, it is also provided that a message authentication code (MAC) is generated by the control and/or regulating unit at least via a part of the received sensor data according to a cryptographic algorithm while using the session key. With the aid of the session key, which has been transmitted at the beginning of a session from the ECU to the sensor, thus both a first MAC in the sensor and a further MAC in the ECU are generated during the actual data transmission. Since the MAC generated in the sensor is transmitted to the control and/or regulating unit, both MACs are available therein and may be used for a manipulation recognition. The same algorithms may be used for generating the MACs in the sensor and in the control and/or regulating unit. The cryptographic algorithm used in the ECU for generating the MAC may be also a symmetrical cryptosystem. It particularly may be provided that it is a cryptosystem according to the AES. The other alternatives listed hereafter for a symmetrical cryptosystem may also be used by the ECU as a cryptographic algorithm for generating the MAC within the meaning of the present invention. The cryptographic algorithm which is used by the ECU for generating the MAC may be the same algorithm which is also used by the sensor for generating the MAC.

It is provided that the sensor is configured for the purpose of generating the MAC via at least a part of the sensor data to be transmitted or received and via a counter value. The counter value may be initialized at predefinable points in time, which may be at the beginning of every session. Furthermore, the counter value may be incremented or decremented at predefinable points in time, which may be after each generation of an MAC.

Furthermore, it particularly may be provided for the MAC to be generated in the ECU not only via at least a part of the received sensor data, but rather also via a counter value. This is to be the same counter value which was also used in the sensor for generating the MAC. It is conceivable that both the sensor and the ECU independently initialize the counter value, for example, at the beginning of a session, and then increment or decrement it at predefined points in time or at predefined events, for example, after each calculation of an MAC. Alternatively, however, it is also possible that the counter value is only initialized and incremented or decremented in the ECU. The counter value may then be transmitted from the ECU to the sensor, for example, via the third logical data transmission channel.

According to a particular refinement of the present invention, it is provided that the message authentication code (MAC) received from the sensor or the part received thereof is compared by the control and/or regulating unit to the message authentication code (MAC) or a part thereof generated by the control and/or regulating unit at least via a part of the received sensor data. If the same algorithms are used to generate the MACs in the sensor and in the control and/or regulating unit, the two MACs are identical in the normal case (i.e., no manipulation of the session key, no manipulation of the transmitted data). This may be verified by the comparison of the two MACs carried out in the control and/or regulating unit. If the two MACs or the corresponding parts thereof are identical, it may be presumed that the sensor has the correct overall key, because otherwise the sensor would not have been able to correctly decrypt the session key and correctly generate the MAC. It is therefore ensured at the same time that the sensor used, from which sensor data were received, is an authentic sensor (implicit authentication of the sensor via the secret key, which is exclusively known to the sensor and the control unit).

The conformance of the two MACs is furthermore an indication that the transmitted sensor data received by the ECU have not been manipulated (data integrity). However, if the two MACs are different, this is an indication of a manipulation of the session key and/or the transmitted data. To be able to preclude different MACs as a result of a transmission error between sensor and control unit, suitable algorithms, for example, based on error probabilities and corresponding statistics, may be implemented on the control unit side. Suitable countermeasures may be taken in case of a manipulation (for example, entry into an error memory of the motor vehicle, transition into a failsafe operation of the internal combustion engine, transmission of a report to the vehicle manufacturer, etc.).

Furthermore, it is provided that the sensor data are transmitted via the first logical data transmission channel at a greater data transmission rate than the security data transmitted via the second logical data transmission channel. The first data transmission channel therefore forms a fast logical channel and the second data transmission channel forms a slow logical channel. Such data transmission mechanisms having a fast and a slow data transmission channel may be implemented in a digital communication bus between the sensor and the ECU, for example, in that, in the bandwidth available for data transmission, a larger part is used for transmitting the data of the fast data transmission channel and a smaller part is used for transmitting the data of the slower data transmission channel.

If the data transmission between the sensor and the ECU takes place in message packets of a defined, predefined length, it is conceivable, for example, that most bits of the message packet are used for transmitting the data of the fast data transmission channel and fewer bits, possibly only single bits or a few bits, of that message packet are used to transmit the data of the slow data transmission channel. If the number of the bits which are used to transmit the data of the slow data transmission channel in a message packet is not to be sufficient to transmit the required security data for recognizing a manipulation of the transmitted sensor data and/or the sensor within an acceptable transmission time, it is conceivable to use multiple message packets to transmit the security data. For this purpose, the security data or a corresponding data stream at the transmitter may be divided (so-called segmenting), in each case only a part (so-called segment) of the security data to be transmitted or the data stream may be transmitted via the slow data transmission channel of a message packet, and at the receiver, parts of various message packets received via the slow data transmission channel may be assembled again to form the security data (so-called concatenating, desegmentation, or assembling). Not only one message packet per communication cycle may be used to transmit the security data, but rather multiple packets per cycle may also be used.

The sensor data may be transmitted via the same physical data transmission channel as the security data. For example, the physical data transmission channel may be a cable or a line, multiple jointly used cables or lines (for example, in the case of transmission of the data with the aid of a differential signal), or a wireless data transmission connection, for example, with the aid of a radio or infrared connection. Furthermore, it is advantageous (but not necessary) for the session key to be transmitted via the same physical data transmission channel as the sensor data and/or the security data. It is also conceivable that the third logical channel is part of the first or second logical channel, i.e., the session key is transmitted via the first or the second logical channel. For this purpose, it is necessary for the particular first or second data transmission channel to support a bidirectional data transmission.

To implement the slow data transmission channel, it would also be conceivable not to transmit the security data or a part thereof together with each of the transmitted message packets, but rather to transmit security data or parts thereof only in every xth message packet (x∈N and x>1). It would also be conceivable in a cycle-based communication system to not use message packets for transmitting the security data in every communication cycle, but rather only in every xth cycle.

One example for implementing a fast and a slow data transmission channel between the sensor and the ECU is, for example, a communication system according to the PSI5 standard from version 2.0. According to this standard, a communication channel and a control channel (so-called messaging channel) are provided for data transmission between a sensor and an ECU. The communication channel could be used within the meaning of the present invention as the fast data transmission channel and the control channel could be used as the slow data transmission channel. For example, present temperature values detected by the sensor, an identification (so-called ID) of the sensor, a version number of the sensor or the software provided thereon, diagnostic data of the sensor, etc., are transmitted via the slow control channel according to the PSI5 standard. According to the present invention, it is provided that the security data for securing the transmitted sensor data and/or the sensor from manipulation are transmitted alternatively or additionally to these data via the control channel.

According to another advantageous refinement of the present invention, it is provided that the session key is generated by the control and/or regulating unit (ECU). According to another specific embodiment, it is also conceivable that the session key is encrypted prior to the transmission to the sensor by the control and/or regulating unit as a function of a secret key. The encrypted session key received from the sensor is advantageously decrypted as a function of the secret key, to ascertain the session key. The secret key is thus known from the beginning to both the sensor and the ECU. The secret key is stored both in the sensor and in the ECU in a memory, which may be a nonvolatile memory. The cryptographic algorithm which is used by the sensor to decrypt the received encrypted session key and to ascertain the session key may be the same algorithm which is also used by the sensor to generate the MAC via at least a part of the sensor data to be transmitted while using the session key. Furthermore, the cryptographic algorithm which is used by the ECU to encrypt the session key prior to its transmission to the sensor may be the same algorithm which is also used by the ECU to generate the MAC at least via a part of the received sensor data while using the session key.

In the ideal case, the secret key is only known to the sensor and the ECU. However, it is also conceivable that the secret key is stored, for example, at the manufacturer of the sensor, the vehicle manufacturer, or another authorized institution (a person, a company, or an authority) or may be regenerated thereby if needed in another way. This has the advantage that in the event of a replacement of the sensor, the matching secret key may be copied into a memory of the ECU, so that it is able to communicate properly with the new sensor, in particular a manipulation of the transmitted sensor data and/or the sensor may thus be recognized by the ECU. Only if both the sensor and the ECU have the same secret key may the sensor ascertain the correct session key, which is in turn a requirement for securing the subsequent transmission of the sensor data and the detection of a manipulation. Since the session key is generated in the sensor as a function of the secret key and is required to generate the message authentication code (MAC) for the sensor data which are to be transmitted or are transmitted from the sensor to the ECU, an authenticity of the sensor and an integrity of the transmitted data may only be verified as correct and proper in the control and/or regulating unit if both the sensor and the ECU have the same shared secret key.

According to another advantageous refinement of the present invention, it is provided that an algorithm used for encrypting and/or decrypting the session key is selected in such a way that a decryption algorithm may be used by the control and/or regulating unit (ECU) for encrypting the session key and a corresponding encryption algorithm may be used by the sensor for decrypting the received encrypted security data. This is possible if a symmetrical encryption algorithm having a symmetrical secret key is used for encrypting or decrypting the session key, the algorithm having to support the functionality that an encrypting algorithm may be used for decrypting and/or a decrypting algorithm may be used for encrypting. Block ciphers (in contrast to stream ciphers) may be used for encrypting and/or decrypting the session key. This refinement has the advantage that on the side of the sensor, only a suitable symmetrical encryption algorithm (actually in the corresponding mode for generating the MAC data) and not also additionally a decryption algorithm (actually for decrypting the encrypted session key) must be implemented.

As noted, an arbitrary encryption algorithm may be used as a cryptographic algorithm; it should support the functionality that an encryption algorithm may be used for the decryption and/or a decryption algorithm may be used for the encryption. Block ciphers may be used as cryptographic algorithms. It particularly may be provided that a symmetrical cryptosystem in the form of a Rijndael algorithm according to the advanced encryption standard (AES) is used for encrypting and decrypting the session key. In addition to the AES encryption standard, there is also a variety of further symmetrical cryptosystems which would be suitable for use in conjunction with the present invention, for example, DES (data encryption standard) or Lucifer, triple DES, IDEA (international data encryption algorithm), Blowfish, Twofish, CAST-128 or CAST-256, RC2, RC5, or RC6 (Rivest cipher), PRESENT, to name only a few. It is entirely conceivable that in the future further symmetrical cryptosystems will be developed, which could also be used in the present invention. The present invention could also be implemented using these known or future cryptosystems.

To prevent an attack on the data transmission by replaying the same data (so-called replay attack), according to one particular specific embodiment, it is provided that the MAC is generated via both at least a part of the sensor data to be transmitted and via a counter value. The counter value is initialized at arbitrary points in time, which may be at the beginning of each session. In addition, the counter value is incremented or decremented at certain chronologically controlled or event-controlled points in time, which may be after every xth generation of a message authentication code (MAC), where x∈N. In this way, it may be ensured that the data, on the basis of which the MAC is generated, differ from time to time, although the sensor data to be transmitted may be identical per se. A different authentication code (MAC) thus results from time to time even for identical sensor data. A replay attack may be effectively and efficiently prevented in this way.

Furthermore, it particularly may be provided that the data are transmitted between the sensor and the control and/or regulating unit (ECU) via an interface according to the PSI5 standard from version 2.0, which may be according to a substandard for the use of a PSI5 interface in the area of a motor vehicle drivetrain. This is a digital data transmission bus, which is configured for the connection of one or multiple sensors to an ECU.

The object on which the present invention is based is also achieved by a sensor of the type mentioned at the outset, which has an arrangement for carrying out the method according to the present invention as described herein. Furthermore, the object is achieved by a control and/or regulating unit (ECU), which has an arrangement for carrying out the method according to the present invention as described herein. Finally, the object on which the present invention is based is also achieved by a network of the type mentioned at the outset, which has an arrangement for carrying out the method according to the present invention.

The present invention is explained in greater detail hereafter on the basis of the figures on the basis of an exemplary embodiment. The present invention may also have the features and advantages specified with reference to the described exemplary embodiment independently of one another and in any arbitrary combination with one another, even if this is not expressly shown in the figures or expressly mentioned in the description.

BRIEF DESCRIPTION OF THE DRAWINGS

FIG. 3 shows an example of multiple data frames transmitted via a data transmission connection to implement multiple logical data transmission channels.

DETAILED DESCRIPTION

Figure 1:
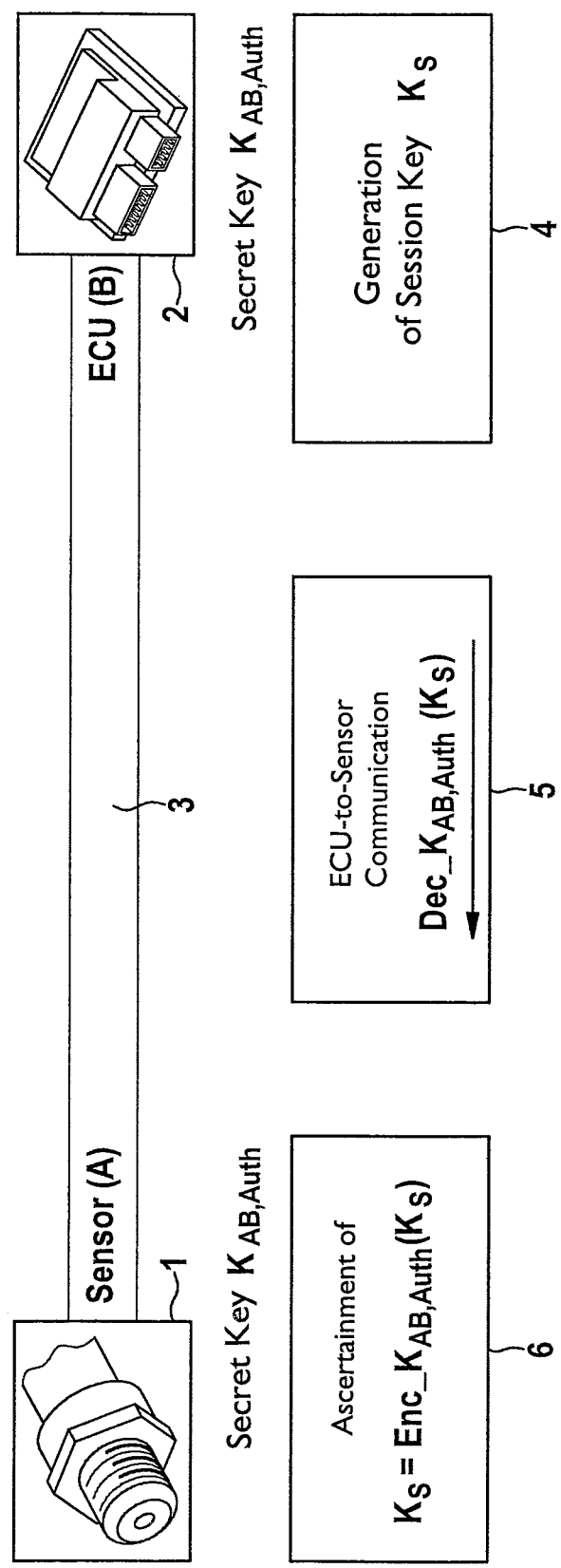
FIG. 1 shows a first section of the method according to the present invention.

The present invention relates to a method for data transmission between a sensor and an electronic control and/or regulating unit (ECU). A manipulation of the transmitted sensor data and/or the sensor may be recognized. A sensor A is shown in the figures, which is identified with reference numeral 1. A control and/or regulating unit (ECU) B is identified with reference numeral 2. Sensor 1 may be connected via a physical data transmission channel in the form of a data transmission connection 3 to ECU 2. Data transmission connection 3 includes, for example, a two-wire line. Multiple data transmission channels are implemented on data transmission connection 3, via which data are transmitted between sensor 1 and ECU 2. Sensor 1 is configured, for example, as a pressure sensor for detecting the fuel pressure in a shared fuel accumulator (for example, common rail) of a fuel injection system of an internal combustion engine of a motor vehicle. Such a sensor 1 detects the fuel pressure prevailing in the fuel accumulator and transmits the detected pressure values as sensor data via data transmission connection 3 to ECU 2. ECU 2 would then accordingly be configured as a control unit for controlling and/or regulating the injection system, in particular for controlling and/or regulating the fuel pressure in the fuel accumulator.

It is presumed that an identical secret key $K_{AB, Auth}$ is stored in a memory of sensor 1 and in a memory of ECU 2. Secret key $K_{AB, Auth}$ may be a symmetrical cryptographic key, which was stored prior to execution of the method according to the present invention in a first memory associated with sensor 1 and in a second memory associated with ECU 2. The memories may be nonvolatile internal memories, which are situated in a housing of sensor 1 or ECU 2, respectively. In the ideal case, secret key $K_{AB, Auth}$ is only known to sensor 1 and ECU 2. In practice, secret key $K_{AB, Auth}$ originates, for example, from a sensor manufacturer, a motor vehicle manufacturer, or from an arbitrary third party, for example, from a certification office.

The method according to the present invention is divided into two sections. The first section is shown in FIG. 1, the second section in FIG. 2. The first section includes the generation of a session key $K_S$ by ECU 2 (step 4). The generation of session key $K_S$ is based on random numbers. The generation of a new session key $K_S$ may be carried out on demand at any arbitrary point in time during a session. It is conceivable that a session key $K_S$ is generated at the beginning of the session, for example, after the actuation of the ignition (terminal 15). Furthermore, it would be conceivable to generate a new session key $K_S$ alternatively or additionally at other points in time and/or after the occurrence of certain events during the session. In this way, new session keys $K_S$ are always available at short time intervals (every x seconds or even milliseconds).

Randomly-generated session key $K_S$ is encrypted by ECU 2 with the aid of a suitable encryption method using shared secret key $K_{AB, Auth}$ and transmitted to sensor 1 (step 5). For the transmission of encrypted session key $K_S$, a logical data transmission channel is used, which is implemented via data transmission connection 3 and which is referred to as a "third data transmission channel." Sensor 1 is in turn capable of ascertaining session key $K_S$, in that it decrypts the received encrypted data using the same method which ECU 2 has used for the encryption, or using the decryption method matching thereto while using shared secret key $K_{AB, Auth}$ (step 6). Session key $K_S$, which has been generated by ECU 2 for the ongoing session, is therefore known to both users, i.e., ECU 2 and sensor 1, if the transmission was correct and the same secret key $K_{AB, Auth}$ was known in both users 1, 2. This first section is shown in FIG. 1.

The encryption method for encrypting session key $K_S$ in ECU 2 and for decrypting session key $K_S$ in sensor 1 is selected in such a way that encryption and decryption algorithms of the method may be used similarly for the encryption in ECU 2, and encryption and decryption algorithms of the method may be used similarly in reverse for decryption in sensor 1. This permits a decryption algorithm (Dec) to be used for encrypting session key $K_S$ in ECU 2. Correspondingly, an encryption algorithm (Enc) is used in sensor 1 to decrypt session key $K_S$. This is possible in particular if, for encryption (Dec) of session key $K_S$ in ECU 2 and for decryption (Enc) of session key $K_S$ in sensor 1, a method in the form of a symmetrical cryptosystem having a symmetrical shared key, secret key $K_{AB, Auth}$, is applied, which allows the encryption algorithm and the decryption algorithm to be exchanged. The symmetrical cryptosystem used may be a Rijndael algorithm according to the advanced encryption standard (AES). In addition to the AES encryption standard, there is also a variety of further symmetrical cryptosystems, which are suitable for use in conjunction with the present invention, in particular arbitrary block ciphers. Examples of these are DES (data encryption standard) or Lucifer, triple DES, IDEA (international data encryption algorithm), Blowfish, Twofish, CAST-128 or CAST-256, RC2, RC5, or RC6 (Rivest cipher), PRESENT, to name only a few.

Fundamentally, any arbitrary standardized, secure symmetrical encryption, for example, advanced encryption standard (AES) having a sufficiently long key length may be used. A key length of 128 bits may be provided. Due to the use of the symmetrical encryption method, session key $K_S$ may be encrypted while using secret key $K_{AB, Auth}$ not only by the encryption function of AES ($Enc_{AES}$), but also by the decryption function ($Dec_{AES}$), in that the special properties of the encryption method are utilized. This means that the encryption function ($Enc_{AES}$) may be used for decryption of the encrypted security data (security key $K_S$) received in sensor 1. This has the advantage that only one encryption function (Enc) must be implemented on the side of sensor 1, which may be used both for decrypting session key $K_S$ and for generating a message authentication code (MAC), which is explained in greater detail hereafter. The available resources in sensor 1 may therefore be used more efficiently. In particular, the required surface area of an ASIC (application specific integrated circuit) may be reduced in relation to the known implementation, where both an encryption function and a decryption function must be provided in the sensor. If the sensor is to support both the decryption (Dec) and the encryption (Enc) in the same AES unit, this would result in an increase of the required chip surface area by approximately 50%.

After the execution of the first method section (cf. FIG. 1), session key $K_S$ is known in both ECU 2 and in sensor 1 and may be used for the ongoing session for an integrity check of the transmitted sensor data and an authentication of sensor 1. This second method section (continuously executed) during a session is shown in FIG. 2.

Figure 2:
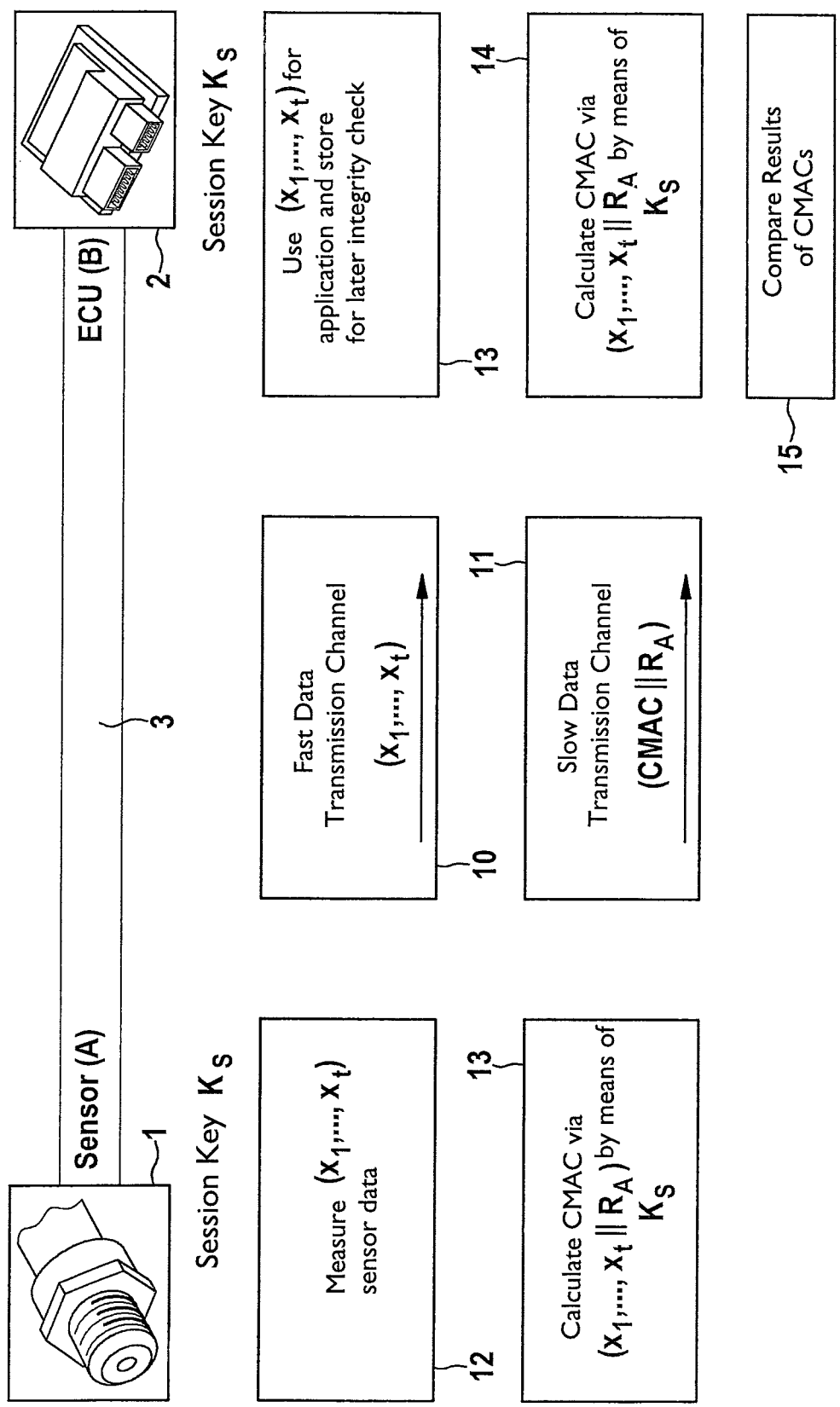
FIG. 2 shows a second section of the method according to the present invention.

FIG. 2 shows two individual logical communication or data transmission channels 10, 11 between sensor 1 and ECU 2, which may be used for a data transmission between sensor 1 and ECU 2 via data transmission connection 3 and which are identified as the "first data transmission channel" and "second data transmission channel." For example, a PSI5 interface version 2.0 and in particular a substandard for the use of a PSI5 interface in the area of a motor vehicle drivetrain is used for the data transmission. First logical data transmission channel 10 is used to transmit the sensor data, for example, pressure data of a shared fuel accumulator of a common rail system, while security data, which are used to secure the transmitted sensor data and/or sensor 1, in particular to recognize a manipulation of the sensor data and/or sensor 1, are transmitted via second logical data transmission channel 11. A data transmission rate of first data transmission channel 10 may be greater than that of second data transmission channel 11, so that first channel 10 may also be referred to as the fast channel and second channel 11 may also be referred to as the slow channel. By allocating the transmission of the sensor data and the security data onto first and second logical data transmission channels 10, 11, it is ensured that no additional delay during the transmission of the sensor data is produced by the provided security measures and no interference is superimposed on the sensor data. The latency times are kept as short as possible.

The implementation of the various logical data transmission channels may be carried out in various ways. FIG. 3 shows one possible implementation form for a data transmission in various logical data transmission channels via a single physical data transmission channel 3. The data transmission from sensor 1 to ECU 2 takes place in data transmission frames #1, #2, #3. Of course, more or fewer than the three data frames #1, #2, #3 shown may also be used for the data transmission. A continuous stream of data frames #1, #2, #3 may be provided via connection 3, or data frames #1, #2, #3 are only transmitted if sensor data $x_1, \ldots, x_r$ and/or MACs are actually to be transmitted. Each data frame #1, #2, #3 is divided into fields which each correspond to a specific data variable, for example, one or multiple bits. A certain number of fields is assigned to each of the logical channels. Thus, in the example from FIG. 3, one field is associated with a first logical channel $k_1$, three fields are associated with a second logical channel $k_2$, three fields are also associated with a third logical channel $k_3$, and again only one field is associated with a fourth logical channel $k_4$.

Of course, a different number of logical channels may be provided per data frame #1, #2, #3. Furthermore, more or fewer than the four logical channels $k_1, k_2, k_3, k_4$ shown may also be provided per data frame #1, #2, #3. In addition, it is conceivable that channels $k_2, k_3$ also include more or fewer than the three fields shown or channels $k_1, k_4$ also include more or fewer than the one field shown.

Per data frame #1, #2, #3, i.e., per unit of time, data of one field are thus transmitted for first channel $k_1$, data of three fields are transmitted for second channel $k_2$, data of three fields are also transmitted for third channel $k_3$, and again data of one field are transmitted for fourth channel $k_4$ and received by ECU 2. A logical data transmission channel is thus implemented using first and fourth channels $k_1$, $k_4$, which has a slower transmission rate than second and third channels $k_2$, $k_3$. It would be conceivable to use one of slow channels $k_1$ or $k_4$ as data transmission channel 11 of the present invention for transmitting the MAC or the CMAC. It would also be conceivable to use one of faster channels $k_2$ or $k_3$ as data transmission channel 10 of the present invention for transmitting sensor data $x_1, \ldots, x_t$.

The data of individual channels $k_1$, $k_2$, $k_3$, $k_4$ transmitted using the individual data frames are buffered at the receiver, i.e., in ECU 2 here, and assembled to form the transmitted data after the reception of the required number of data frames #1, #2, #3. For example, if the data to be transmitted via one of slow channels $k_1$ or $k_4$ (for example, security data, such as MAC or CMAC) include 64 bits and the individual fields of data frames #1, #2, #3 are each 8 bits in size, eight data frames must be received before ECU 2 has all 64 bits of the transmitted data available. This applies accordingly to the transmission of sensor data $x_1, \ldots, x_t$ via one of fast channels $k_2$ or $k_3$. This applies to the logical level described here. On the protocol level, the transmitted data do not exclusively include useful data, strictly speaking, but rather contain auxiliary data, which are required for the protocol (for example, frame start and frame end sequences, frame IDs, . . . ) or the error recognition or correction (for example, frame check sequence FSC, cyclic redundancy check CRC, . . . ).

In summary, a first part of the useful data capacity of data frames #1, #2, #3 is used to transmit sensor data $x_1, \ldots, x_t$. Another part of the useful data capacity of data frames #1, #2, #3 is used to transmit the security data (for example, MAC or CMAC). The useful data capacity of a data frame #1, #2, #3 used for the transmission of the security data may be less (for example, it is only a few bits) than the useful data capacity used for the transmission of the sensor data (for example, it is several tens, 100s, 1000s, or even more bits). In this way, slow logical data transmission channel 11 and fast logical data transmission channel 10 may be implemented in a simple and efficient way. Furthermore, it would be conceivable to implement slow data transmission channel 11 in that parts of the MAC or CMAC are not transmitted in every data frame #1, #2, #3, but rather only in every xth data frame (x being a natural number greater than 1).

The security measures according to the second method step (cf. FIG. 2) are used for the integrity check of the sensor data and additionally as an implicit authentication response of sensor 1 to the implicit question of ECU 2 in the first method section (cf. FIG. 1). The security measures thus include an implicit authentication of sensor 1. In detail, all sensor data which are transmitted via fast data transmission channel 10 are protected by a message authentication code (MAC), which is generated with the aid of session key $K_S$ and may be transmitted via slow data transmission channel 11. Since the MAC is generated with the aid of a key (or a cipher) according to the AES, for example, it is also referred to as a "cipher-based MAC" (CMAC). It is conceivable to encrypt the MAC or the CMAC prior to the transmission from sensor 1 to ECU 2. The CMAC is based, for example, on AES 128 and session key $K_S$, which was transmitted in the first method step (cf. FIG. 1) to sensor 1 or was generated therein from the encrypted data received from ECU 2. The implicit authentication means that session key $K_S$ may only be decrypted by an authentic sensor 1 in the first method step. Only such an authentic sensor 1 has knowledge about secret key $K_{AB, Auth}$.

In sensor 1, the sensor data which are transmitted via fast data transmission channel 10, or selected parts thereof, are fed into a CMAC algorithm, which uses session key $K_S$ as the key. After a certain amount of data of the sensor data has been transmitted, a CMAC value is generated. The CMAC value is generated via all sensor data or a selected part of the sensor data. This CMAC is transmitted via slow data transmission channel 11 to ECU 2. The sensor data subsequently detected by sensor 1 are in turn fed into the CMAC algorithm and used to generate the next CMAC value. The amount of the sensor data, on the basis of which a CMAC is generated, is dependent, inter alia, on the available bandwidth on slow data transmission channel 11, the robustness against bit errors, and the security requirements.

In addition, the CMAC value may also be generated via a counter value $R_A$. Counter value $R_A$ protects the protocol against attacks by replay (so-called replay attack), since it prevents identical sensor values from resulting in identical CMACs. As a result of considered counter value $R_A$, even identical sensor values have different CMACs. Counter value $R_A$ may be initialized to zero or another starting value respectively upon the beginning of a new session. However, it is also possible that the counter initial value is generated by ECU 2 in each case and transmitted to sensor 1 (encrypted or unencrypted) together with or separately from session key $K_S$. The robustness against replay attacks may thus be additionally increased.

Counter value $R_A$ may also be initialized during an ongoing session, however. A new session may be defined in each case by the transmission of a new session key $K_S$. Counter value $R_A$ is incremented or decremented both in sensor 1 and in ECU 2 by 1 or by another arbitrary value at chronologically controlled or event-controlled points in time, which may be after each generation of a CMAC. Alternatively, it would also be conceivable that counter value $R_A$ is only initialized and incremented or decremented in ECU 2 and then regularly transmitted to sensor 1, for example, via slow data transmission channel 11.

The same calculations are carried out on the side of ECU 2, also using session key $K_S$, counter value $R_A$, and the sensor data received via fast data transmission channel 10 from sensor 1. These calculations are carried out and the sensor data arrive at ECU 2 and in parallel to the other processing of the sensor data by ECU 2. True parallel processing may be achieved in that a hardware security module (HSM) is available in ECU 2, which offers hardware assistance for AES-based CMAC. Due to the provided security measures, no delays of the conventional sensor data analysis by ECU 2 result in ECU 2. The calculations in ECU 2 also include the generation of an MAC via the incoming sensor data or a part thereof and optionally via counter value $R_A$ while using session key $K_S$. If the MAC generated by sensor 1 was encrypted prior to the transmission to ECU 2, the incoming CMAC is decrypted in ECU 2. The MAC generated in ECU 2 is then compared to the MAC which was received in ECU 2 from sensor 1 via slow data transmission channel 11. If the two MAC values are identical, it may be inferred that both the sensor data and session key $K_S$, which was used on the side of sensor 1 for generating the MAC, are identical to the corresponding values which were used on the side of ECU 2 for generating the MAC. In detail, it is thus shown:

Sensor 1 has knowledge about present session key $K_S$, which was generated by ECU 2.

This implies that sensor 1 was capable of decrypting session key $K_S$ while using secret key $K_{AB, Auth}$ and therefore also has knowledge about correct secret key $K_{AB, Auth}$. An authentication of sensor 1 may thus be carried out.

The sensor data which were received by ECU 2 are the same which were emitted by sensor 1. This implies that no manipulation of the data and no transmission errors have occurred.

Counter value $R_A$ is identical both in sensor 1 and in ECU 2. This indicates that no attack by replay (replay attack) has occurred and therefore that the integrity of the sensor data received in ECU 2 is provided.

If a comparison of the two MAC values in ECU 2 shows that the MACs are different, it is presumed that one or multiple of the input variables ($K_{AB, Auth}$, $K_S$, $R_A$) were not identical, or that different sensor data were transmitted in sensor 1 than were received in ECU 2, and/or that the data transmission was faulty, for example, because it was manipulated. A certain number of incorrect (not corresponding) MACs is advantageously permitted before a non-authenticated sensor 1 or manipulated sensor data is inferred. The number of the permitted incorrect MACs is dependent on the bit error rate (BER) of all participating communication channels, i.e., (fast) first channel 10 for the sensor values, (slow) second channel 11 for the MACs, and optionally the third channel for the ECU-to-sensor communication. To preclude errors here or to lower the error probability as a result of communication errors below an acceptable limiting value of a desired security level, it may be necessary to carry out the authentication method for sensor 1 (in the simplest case the transmission of a new session key $K_S$) multiple times. Because a certain number of incorrect MACs is permitted, the probability that a manipulated sensor 1 or manipulated sensor data will be incorrectly inferred on the basis of a single incorrect transmission may be reduced to the desired security level.

Due to the use of the MAC approach based on a suitable symmetrical encryption, in particular of suitable block ciphers, the calculation of the MAC may be carried out independently of one another on both sides, i.e., in sensor 1 and in ECU 2. In contrast to a signature-based approach, it is sufficient in the case of the present invention if only parts of the MAC are compared to one another. This may be used for the purpose of reducing the amount of security data to be transmitted to implement the manipulation safeguard. It is thus conceivable, for example, to only transmit a part of the sensor-generated MAC, for example, in the case of a 128-bit long MAC, only the 64 bits having the highest significance (so-called most significant bits, MSBs), and to compare them on the side of ECU 2 with the corresponding part of the ECU-generated MAC.

The approach provided according to the present invention having the use of session key $K_S$ and the corresponding implementation has an array of advantages:

Every session key $K_S$ is only used for a certain duration and a restricted number of bits. A new session key $K_S$ is then generated, transmitted to sensor 1, and used for the subsequent session to generate the MAC or the CMAC. For this reason, the method according to the present invention is less susceptible for side channel attacks than a static key for the MAC processing. Session key $K_S$ is thus a dynamic key.

Different keys, namely secret key $K_{AB, Auth}$ and session key $K_S$ are used for the authentication and the integrity check.

Only one key, namely secret key $K_{AB, Auth}$, must be permanently and securely stored in sensor 1 and ECU 2. The costs for the memory and other costs in conjunction with rewriting the memory with a (new or additional) secret key are thus reduced.

The use of the decryption function (Dec) for the encryption of session key $K_S$ and the encryption function (Enc) for the decryption of session key $K_S$ reduces the cost and complexity of sensor 1, since only the encryption function (Enc) must be implemented therein. This is related to the use of a suitable symmetrical cryptosystem, in particular of suitable block ciphers.

In the method according to the present invention, questions and responses for authentication of sensor 1 are implicitly contained, whereby the complexity, the computing power, and the costs of the protocol for the sensor to ECU communication may be reduced, since no special messages are required for the authentication. This reduces the implementation expenditure and the costs connected thereto, in particular on the side of sensor 1.

The transmitted sensor data may be not encrypted. The received sensor data therefore do not have to be decrypted on the side of ECU 2, whereby the latency times may be kept as short as possible. The processing of the sensor data in ECU 2 may begin immediately after the reception thereof, without the data initially having to be decrypted.

The method provided according to the present invention has the following properties:

A "real" sensor 1 may be implicitly authenticated.

The integrity of the transmitted sensor data may be checked.

No additional delays for the sensor data from the viewpoint of ECU 2, as a result of the provided security implementation.

Different keys ($K_{AB, Auth}$, $K_S$) for authentication and for integrity protection are implemented.

There is only one chronologically very restricted manipulation window (for example, less than three seconds) even at high bit error rates (BER), since the manipulation of the data may be recognized relatively rapidly. This has to do, inter alia, with the amount of the data used in an MAC and the number of the accepted "incorrect" MACs.

Simple protocol, which uses an implicit authentication step, whereby fewer hardware and software resources are necessary.

The minimal resources only include a symmetrical cryptographic key ($K_{AB, Auth}$), which must be securely stored in sensor 1 and ECU 2, and only one symmetrical encryption (Enc) on the side of sensor 1, for example, an AES encryption. Therefore, no decryption (Dec) must be implemented on the side of sensor 1.

Use of a session key $K_S$ and regular replacement of this key, whereby the vulnerability of sensor 1 or the sensor-to-ECU by a so-called differential power analysis (DPA) is reduced.

What is claimed is:

1. A method for providing data transmission between a sensor and an electronic control unit, the method comprising:

securing sensor data and the sensor against a manipulation, wherein the sensor data are transmitted via a first logical data transmission channel at a first data transmission rate from the sensor to the control unit, and security data for securing the transmitted sensor data and the sensor are transmitted via a second logical data transmission channel at a second data transmission rate from the sensor to the control unit; and transmitting, at least once at the beginning of a data transmission session, via a third logical data transmission channel, a session key from the control unit to the sensor and received by a latter;

wherein the session key is used by the sensor at least for an ongoing session to generate the security data, and wherein a message authentication code is generated by the sensor at least via a part of the sensor data to be transmitted according to an encryption method while using the session key and is transmitted at least partially via the second data transmission channel as security data to the control unit and received by the latter, and wherein only n bits which are selectively chosen and which correspond to only a part of the message authentication code generated in the sensor are transmitted via the second data transmission channel to the control unit.

2. The method of claim 1, wherein the message authentication code is generated by the control unit at least via a part of the received sensor data according to an encryption process while using the session key.

3. The method of claim 1, wherein the message authentication code received from the sensor or the received part thereof is compared by the control unit to the message authentication code or a part thereof generated by the control unit at least via a part of the received sensor data.

4. The method of claim 1, wherein the sensor data are transmitted via the first logical data transmission channel at a greater data transmission rate than the security data via the second logical data transmission channel.

5. The method of claim 1, wherein the sensor data are transmitted via the same physical data transmission channel as the security data.

6. The method of claim 1, wherein the session key is transmitted via the same physical data transmission channel as at least one of the sensor data and the security data.

7. The method of claim 1, wherein the session key is generated by the control unit according to a random principle.

8. The method of claim 1, wherein the session key is encrypted by the control unit prior to the transmission to the sensor according to an encryption process as a function of a secret key.

9. The method of claim 8, wherein the received encrypted session key is decrypted by the sensor according to an encryption process as a function of the secret key, to ascertain the session key for the sensor.

10. The method of claim 8, wherein the encryption process used for at least one of encrypting and/or decrypting the session key is selected so that at least one of a (i) decryption algorithm is useable by the control unit for encrypting the session key and (ii) a corresponding encryption algorithm is useable by the sensor for decrypting the received encrypted session key.

11. The method of claim 8, wherein the same encryption process is used for at least one of encrypting and decrypting the session key and for generating the message authentication code in the sensor and the control unit.

12. The method of claim 8, wherein a Rijndael algorithm according to the advanced encryption standard (AES) is used as the encryption process for at least one of encrypting the session key, decrypting the session key, and generating the message authentication code.

13. The method of claim 1, wherein the security data generated by the sensor are encrypted prior to a transmission to the control unit, and the encrypted security data are transmitted and decrypted in the control unit to generate the security data.

14. The method of claim 1, wherein the message authentication code is generated via at least a part of the sensor data to be transmitted or the received sensor data and a counter value.

15. The method of claim 14, wherein at least one of (i) the counter value is initialized at predefinable points in time, and (ii) the counter value is one of incremented or decremented at predefinable points in time.

16. The method of claim 14, wherein at least one of (i) the counter value is initialized at predefinable points in time, which is at the beginning of each session, and (ii) the counter value is one of incremented or decremented at predefinable points in time, which is after each generation of a message authentication code.

17. The method of claim 1, wherein the data are transmitted between the sensor and the control unit via an interface according to the PSI5 standard from version 2.0.

18. The method of claim 1, wherein the data are transmitted between the sensor and the control unit via an interface according to the PSI5 standard from version 2.0, which is according to a substandard for use of a PSI5 interface in the area of a motor vehicle drivetrain.

19. A sensor, for connection to an electronic control unit and configured for transmission of sensor data to the control unit, comprising:
a processor coupled to a memory device, the processor including:
a securing arrangement to secure sensor data and the sensor against a manipulation, wherein the sensor data are transmitted via a first logical data transmission channel at a first data transmission rate from the sensor to the control unit, and security data for securing at least one of the transmitted sensor data and the sensor are transmitted via a second logical data transmission channel at a second data transmission rate from the sensor to the control unit; and
a transmitting arrangement to transmit, at least once at the beginning of a data transmission session, via a third logical data transmission channel, a session key from the control unit to the sensor and received by a latter;
wherein the session key is used by the sensor at least for an ongoing session to generate the security data, and wherein a message authentication code is generated by the sensor at least via a part of the sensor data to be transmitted according to an encryption method while using the session key and is transmitted at least partially via the second data transmission channel as security data to the control unit and received by the latter, and wherein only n bits which are selectively chosen and which correspond to only a part of the message authentication code generated in the sensor are transmitted via the second data transmission channel to the control unit.

20. A control unit, for connection to a sensor and configured for reception of sensor data from the sensor, comprising:
a processor coupled to a memory device, the processor including a control arrangement configured
to provide data transmission between the sensor and the control arrangement, by performing the following:
securing transmitted sensor data and the sensor against a manipulation, wherein the sensor data are transmitted via a first logical data transmission channel at a first data transmission rate from the sensor to the control unit, and security data for securing at least one of the transmitted sensor data and the sensor are transmitted via a second logical data transmission channel at a second data transmission rate from the sensor to the control unit; and
transmitting, at least once at the beginning of a data transmission session, via a third logical data transmission channel, a session key from the control unit to the sensor and received by a latter;
wherein the session key is used by the sensor at least for an ongoing session to generate the security data, and wherein a message authentication code is generated by the sensor at least via a part of the sensor data to be transmitted according to an encryption method while using the session key and is transmitted at least partially via the second data transmission channel as security data to the control unit and received by the latter, and wherein only n bits which are selectively chosen and which correspond to only a part of the message authentication code generated in the sensor are transmitted via the second data transmission channel to the control unit.

21. A network, comprising:
a control unit; and
at least one sensor connected thereto via a data transmission connection;
wherein the sensor is for connection to the control unit and configured for transmission of sensor data to the control unit, and includes:
   a securing arrangement to secure transmitted sensor data and the sensor secured against a manipulation, wherein the sensor data are transmitted via a first logical data transmission channel at a first data transmission rate from the sensor to the control unit, and security data for securing at least one of the transmitted sensor data and/or the sensor are transmitted via a second logical data transmission channel at a second data transmission rate from the sensor to the control unit; and
   a transmitting arrangement to transmit, at least once at the beginning of a data transmission session, via a third logical data transmission channel, a session key from the control unit to the sensor and received by the latter;
wherein the session key is used by the sensor at least for an ongoing session to generate the security data, and wherein a message authentication code is generated by the sensor at least via a part of the sensor data to be transmitted according to an encryption method while using the session key and is transmitted at least partially via the second data transmission channel as security data to the control unit and received by the latter, and wherein only n bits which are selectively chosen and which correspond to only a part of the message authentication code generated in the sensor are transmitted via the second data transmission channel to the control unit.

* * * * *